US009525973B2

(12) United States Patent
Rácz et al.

(10) Patent No.: US 9,525,973 B2
(45) Date of Patent: Dec. 20, 2016

(54) RADIO NETWORK NODE AND METHODS THEREIN

(75) Inventors: András Rácz, Budapest (HU); Mehdi Amirijoo, Linköping (SE); Fredrik Gunnarsson, Linköping (SE); Johan Moe, Mantorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/353,609

(22) PCT Filed: Oct. 24, 2011

(86) PCT No.: PCT/SE2011/051257
§ 371 (c)(1),
(2), (4) Date: Apr. 23, 2014

(87) PCT Pub. No.: WO2013/062451
PCT Pub. Date: May 2, 2013

(65) Prior Publication Data
US 2014/0295884 A1    Oct. 2, 2014

(51) Int. Cl.
*H04W 4/02* (2009.01)
*H04W 24/00* (2009.01)
*G01S 5/00* (2006.01)
*H04W 64/00* (2009.01)

(52) U.S. Cl.
CPC ............ *H04W 4/023* (2013.01); *G01S 5/0018* (2013.01); *H04W 4/028* (2013.01); *H04W 24/00* (2013.01); *H04W 64/00* (2013.01)

(58) Field of Classification Search
CPC ...... H04W 4/023; H04W 4/028; H04W 24/00; H04W 64/00; G01S 5/0118
See application file for complete search history.

(56) References Cited

U.S. PATENT DOCUMENTS

2013/0137460 A1*  5/2013  Bodog et al. .............. 455/456.2

OTHER PUBLICATIONS

International Search Report for PCT Application No. PCT/SE2011/051257, mailed Jul. 19, 2012, 4 pages.
Written Opinion of the International Searching Authority for PCT Application No. PCT/SE2011/051257, mailed Jul. 19, 2012, 11 pages.
Huawei: "MDT location control and correlation" 3GPP Draft; R2-104674,3$^{rd}$ Generation Partnership Project (3GPP), Mobile Competence Centre; 650, Route Des Lucioles; F-06921 Sophia-Antipolis cedex; France; vol. RAN WG2, No. Madrid Spain; Aug. 16, 2010; XP050451749; 8 pages.
(Continued)

*Primary Examiner* — Marcos Torres
(74) *Attorney, Agent, or Firm* — Myers Bigel, P.A.

(57) ABSTRACT

A method in a radio network node is disclosed for handling positioning data in a radio communications network, which radio network node serves a user equipment in a cell. The radio network node obtains positioning data from the user equipment, which positioning data is associated with a positioning measurement for positioning the user equipment. The radio network node associates the obtained positioning data with an on-going trace session of the user equipment. The radio network node then sends a trace record to a network management node, which trace record includes information associated with the positioning data.

28 Claims, 10 Drawing Sheets

(56) References Cited

OTHER PUBLICATIONS

Ericsson: "pCR to shadow TS 32.422 for MDT, a Coordination of network based localization with MDTa", 3GPP Draft; S5UEPM0016 COORD_LOCALAZATION_MDT, $3^{rd}$ Generation Partnership Project (3GPP), 650, Route Des Lucioles; F-06921 Sophia-Antipolis cedex; France, vol. SA WG5, Oct. 20, 2010; XP050528146; 5 pages.

Ericsson: "Adding requirements for MDT positioning" 3GPP Draft; S5-112425 CR R11 32.421 MDT_POS_REQ, $3^{rd}$ Generation Partnership Project (3GPP), Mobile Competence Centre; 650, Route Des Lucioles; F-06921 Sophia-Antipolis cedex; France, vol. SA WG5, No. Istanbul, Turkey; Aug. 12, 2011; XP050551303; 4 pages.

3GPP TS 32.422 V11.9.0 (Mar. 2014) $3^{rd}$ Generation Partnership Project; Technical Specification Group Services and System Aspects; Telecommunication management; Subscriber and equipment trace; Trace control and configuration management (Release 11); 650, Route des Lucioles; F-06921 Sophia-Antipolis cedex; France; 133 pages.

3GPP TS 36.455 V11.3.0 (Jun. 2013) $3^{rd}$ Generation Partnership Project; Technical Specification Group Radio Access Network; Evolved Universal Terrestrial Radio Access (E-UTRA); LTE Positioning Protocol A (LPPa) (Release 11); 650, Route des Lucioles; F-06921 Sophia-Antipolis cedex; France; 60 pages.

3GPP TS 36.355 V11.5.0 (Dec. 2013) $3^{rd}$ Generation Partnership Project; Technical Specification Group Radio Access Network; Evolved Universal Terrestrial Radio Access (E-UTRA); LTE Positioning Protocol (LPP) (Release 11); ), 650, Route des Lucioles; F-06921 Sophia-Antipolis cedex; France; 118 pages.

\* cited by examiner

RADIO NETWORK NODE AND METHODS THEREIN

CROSS REFERENCE TO RELATED APPLICATION

This application is a 35 U.S.C. §371 national stage application of PCT International Application No. PCT/SE2011/051257, filed on 24 Oct. 2011, the disclosure and content of which is incorporated by reference herein in its entirety. The above-referenced PCT International Application was published in the English language as International Publication No. WO 2013/062451 A1 on 2 May 2013.

TECHNICAL FIELD

Embodiments herein relate to a radio network node, a network management node and methods therein. In particular, embodiments herein relate to collect positioning data in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The UEs transmit data over an air or radio interface to the radio base stations in uplink (UL) transmissions and the radio base stations transmit data over an air or radio interface to the UEs in downlink (DL) transmissions.

Above mentioned existing 3rd Generation Partnership Project (3GPP) systems, including Second Generation (2G)/Third Generation (3G) systems and the newly emerging System Architecture Evolution (SAE)/LTE system, support the possibility to trace a particular user of a user equipment and/or a UE throughout its lifetime in the radio communications network, where the users for tracing may be selected based on: user identity, e.g. International Mobile Subscriber Identity (IMSI) based trace; terminal identity e.g. International Mobile Equipment Identity (IMEI) based trace; or based on location e.g. cell trace. During tracing all network activities related to the particular UE may be logged and later delivered to a central management entity, also called network management node, for evaluation. Logged network activities comprise signaling messages sent/received either on the radio interface or on network node interfaces. Some typical use cases of the result of such a tracing are to e.g. troubleshoot problematic connections to a particular user, e.g. in response to complaints from the particular user of the UE, or to monitor generic network performance and to perform root cause analysis to identify network problems.

According to a legacy trace concept, the trace target, e.g. a UE, and the trace configuration are specified by the network management node, which sends the configuration to the involved network nodes. In the trace configuration there is possibility to specify the interface(s) from which trace logs are to be collected, as well as, the level of trace information details, e.g., all message elements logged or only most relevant ones.

In current 3GPP systems there are two ways to activate a tracing, either via "signaling based activation" or "management based activation". In "signaling based activation" the trigger for tracing a particular UE is propagated piggy-backed on the regular UE-specific signaling messages sent between the network nodes which the user data flow of the particular UE passes through. Initially the management system configures the particular UE for tracing in the Home Subscriber System (HSS) or in core network nodes e.g. Mobility Management Entity (MME), Serving General Packet Radio Services (GPRS) Support Node (SGSN) based on the IMSI of the user/subscriber or IMEI of the UE. As soon as the UE with the given IMSI or a UE with the IMEI appears in the system and the HSS is interrogated for user information, e.g., security credentials at user attach, a trigger for activating the tracing may be propagated to related network nodes via the invoked signaling flow. In "management based activation" the trigger for activating the tracing is not propagated to other nodes. The management system configures selected network nodes to trace a particular UE or set of UEs. When a new user or UE appears at the given network node, it evaluates the selection criteria and starts trace recording in case the criteria is satisfied.

More recently, 3GPP has started to work with the concept of "UE based network performance measurements", also called, Minimization of Drive Test (MDT) measurements, where the objective is to utilize the network measurements done by the UE for network performance monitoring and optimization purposes. For the management of such UE measurements 3GPP has selected to use the trace concept, which means that the network management node may configure and collect such measurements by using the trace methods. 3GPP has also defined a number of requirements on selection options that shall be defined in the standard and shall be available for the network operator to specify which UEs shall take part in a measurement campaign e.g., selected based on IMSI and/or IMEI, cell, device capabilities and/or combinations of these. There are two types of MDT measurement modes defined, the so called immediate MDT measurements, which are performed when the UE is in a connected mode, and the so called logged MDT measurements, which are performed when the UE is in an idle mode. Immediate MDT measurements are associated with immediate reporting, i.e., the UE sends measurement reports as it collects them and no temporary storage in the UE is performed. Logged MDT measurements are associated with logged reporting when the UE collects and logs a number of measurement reports and sends them to the radio communications network in a bundle the next time when it enters connected mode.

An important aspect of MDT measurements is whether location information, i.e. position, can be associated with the measurements. Obviously, when position is available there is room for more advanced network optimization and performance observation use cases. It has been accepted as a requirement for MDT to support the reporting of UE position as a complement to MDT measurement data in order to enable network optimization use cases such as localizing coverage and/or capacity problems and to use MDT measurements as a replacement of regular drive tests in accordance with the original intentions of MDT. It has also been agreed that the UE may include any positioning information in the MDT measurement reports that it may have, for instance GPS coordinates or Radio Frequency (RF) fingerprints. On the other hand, 3GPP systems already support network based UE positioning methods, which are available both in Universal Mobile Telecommunications System (UMTS) Terrestrial Radio Access Network (UTRAN) and in Evolved-UTRAN (E-UTRAN). The positioning methods may broadly be classified as: (1) UE based positioning; and (2) UE assisted and/or network based positioning. In the first case the positioning may be calculated by the UE itself with or without assistance from the positioning node. In case of UE assisted and/or network based positioning, the position is calculated by the network, e.g. the positioning node, typically utilizing UE measurements as well. The positioning node performing the positioning calculation in the network may be a Serving Mobile Location Centre (SMLC) or Enhanced-SMLC (E-SMLC) in case of E-UTRAN.

In e.g. the current LTE system, the UE and network measurements for positioning purposes go transparently over the radio network and thereby there is no possibility to collect these measurements and send them to the Operation and Maintenance (OAM) system for processing, i.e., for calculation of UE position. Thus, an OAM node is not able to calculate position of a UE for MDT measurements. Using the network based positioning architecture, e.g. E-SMLC based positioning, would have its limitation in terms of signaling and processing scalability. The E-SMLC based positioning has been designed to support location based services, i.e., occasional and one time positioning. In case of MDT measurements the positioning needs to be executed for a large number of UEs, potentially in the entire network, and continuously with second level periodicity, to which the E-SMLC based solution would not scale.

SUMMARY

An object of embodiments herein is to enhance the monitoring of a radio communications network in an efficient manner According to an aspect of embodiments herein the object is achieved by a method in a radio network node for handling positioning data in a radio communications network. The radio network node serves a user equipment in a cell. The radio network node obtains positioning data from the user equipment, which positioning data is associated with a positioning measurement for positioning the user equipment. The radio network node associates the obtained positioning data with an on-going trace session of the user equipment. The radio network node then sends a trace record to a network management node, which trace record comprises information associated with the positioning data.

According to another aspect of embodiments herein the object is achieved by a radio network node for handling positioning data in a radio communications network. The radio network node serves a user equipment in a cell. The radio network node comprises an obtaining circuit configured to obtain positioning data from the user equipment. The positioning data is associated with a positioning measurement for positioning the user equipment. The radio network node further comprises an associating circuit configured to associate the obtained positioning data with an on-going trace session of the user equipment. The radio network node additionally comprises a sending circuit configured to send a trace record to a network management node, which trace record comprises information associated with the positioning data.

According to yet another aspect of embodiments herein the object is achieved by a method in a network management node for collecting a trace measurements in a radio communications network. The network management node collects the trace measurement from the user equipment in a cell served by the radio network node. The network management node receives a first trace record from the radio network node, which trace record comprises a positioning measurement of the user equipment. The network management node further receives a second trace record from the radio network node. The second trace record comprises the trace measurement of the user equipment of a tracing session. The network management node then associates the received positioning measurement with the received trace measurement.

According to still another aspect of embodiments herein the object is achieved by a network management node for collecting a trace measurement in a radio communications network. The network management node is configured to collect the trace measurement from a user equipment in a cell served by a radio network node. The network management node comprises a receiving circuit configured to receive a first trace record comprising a positioning measurement of the user equipment from the radio network node. Furthermore, the receiving circuit is configured to receive a second trace record comprising the trace measurement of the user equipment of a tracing session from the radio network node. The network management node additionally comprises an associating circuit configured to associate the received positioning measurement with the received trace measurement.

By adding the associating function in the radio network node and/or in the network management node the on-going trace session is associated with the positioning data in an efficient manner as the positioning data is retrieved at the radio network node and not from the positioning node. Thus, more advanced network optimization and performance observation use cases may be performed enhancing the monitoring of the radio communications network in an efficient manner.

BRIEF DESCRIPTION OF THE DRAWINGS

Embodiments will now be described in more detail in relation to the enclosed drawings, in which.

DETAILED DESCRIPTION

Figure 1:
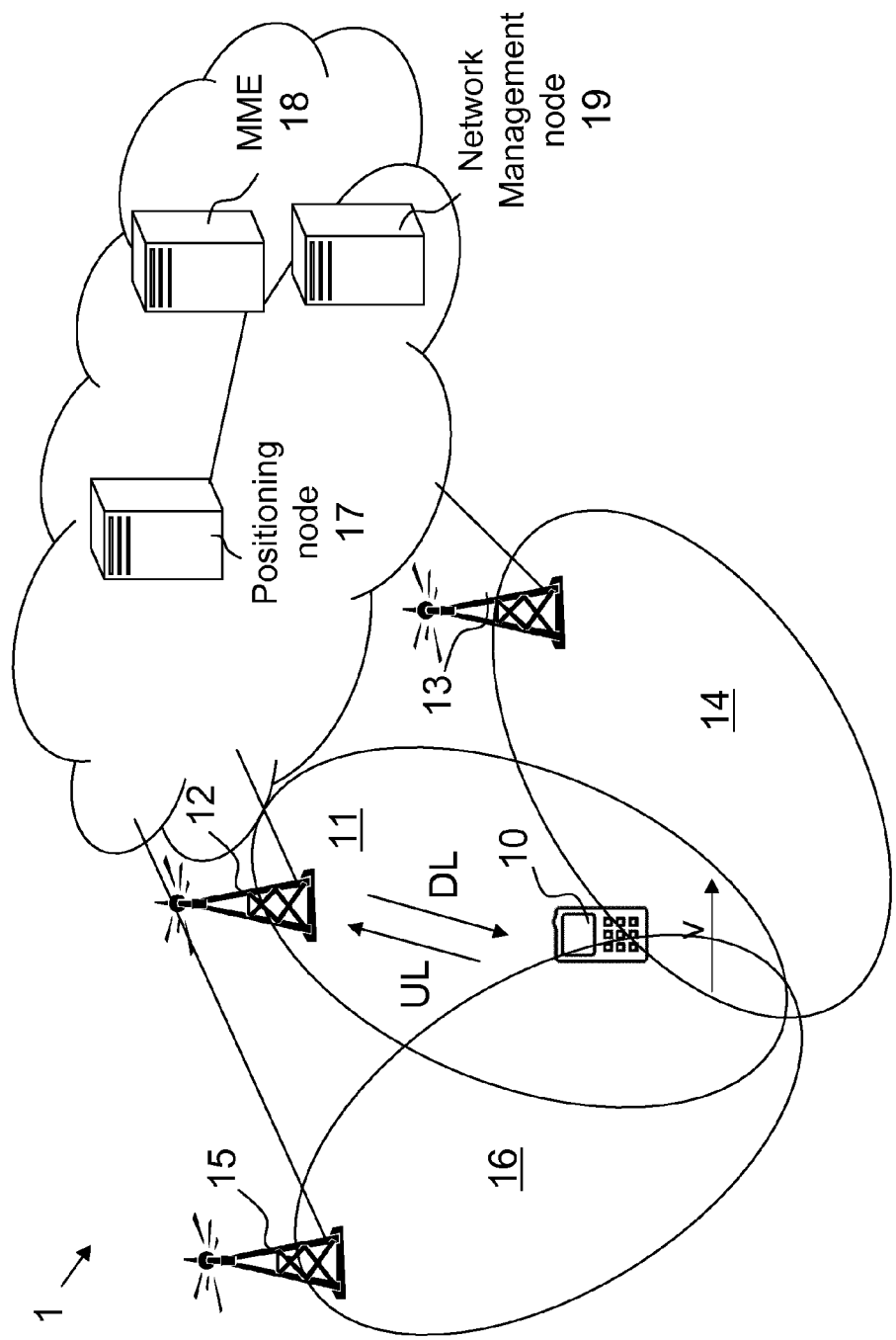
FIG. 1 is a schematic overview depicting embodiments herein.

FIG. 1 is a schematic overview depicting embodiments in a radio communications network 1. The radio communications network 1 may use a number of different technologies, such as LTE, LTE-Advanced, WCDMA, GSM/EDGE, WiMax, or UMB, just to mention a few possible implementations. The radio communications network 1 comprises a radio network node 12, also referred to as a first radio network node 12, providing radio coverage over at least one geographical area forming a first cell 11. The cell definition may also incorporate frequency bands used for transmissions, which means that two different cells may cover the same geographical area but using different frequency bands. A user equipment (UE) 10 is served in the first cell 11 by the first radio network node 12 and is communicating with the first radio network node 12. The UE 10 transmits data over an air or radio interface to the first radio network node 12 in UL transmissions and the first radio network node 12 transmits data over an air or radio interface to the UE 10 in DL transmissions. The UE 10 may move with a velocity v towards a second cell 14 which is provided by a second radio network node 13. Furthermore, a third radio network node 15 is providing radio coverage over an area forming a third cell 16. It should be understood by the skilled in the art that "UE" is a non-limiting term which means any wireless terminal, device or node e.g. Personal Digital Assistant (PDA), laptop, mobile, sensor, relay, mobile tablets or even a small base station communicating within respective cell. The respective radio network node 12,13,15 may also be referred to as e.g. a radio base station, a NodeB, an evolved Node B (eNB, eNode B), a base transceiver station, an Access Point Base Station, a base station router, or any other network unit capable to communicate with a UE within the cells served by the respective radio network node 12,13,15 depending e.g. of the radio access technology and terminology used. Other examples of the radio network nodes are beacon stations or relay stations etc.

Positioning

The UE 10 may be positioned within the radio communications network 1 with the assistance of a positioning node 17 analyzing radio measurements at the UE 10 from the different radio network nodes 12,13,15. Additionally, the radio communications network 1 may comprise a Mobility Management Entity (MME) 18 enabling handover and collecting mobility data of the UE 10. The MME 18 may e.g. receive a request for a location service associated with the UE 10, from another network entity or the MME 18 may decide itself to perform positioning functions for the UE 10. Then the MME 18 sends a location service request to the positioning node 17, e.g. an E-SMLC or SMLC, which is in the core network. The positioning node 17 processes the location services request which may include transferring assistance data to the UE 10 to assist with UE-based and/or UE-assisted positioning and/or may include positioning of the UE 10. The UE 10 may also be called target UE. The positioning node 17 then returns the result of the location service back to the MME 18.

The positioning node 17 may use the LTE Positioning Protocol (LPP) to communicate with the UE 10, including sending assistance data to the UE 10, sending positioning measurement configuration, which may be comprised in a configuration signaling message, and receiving positioning measurement reports from the UE 10. The positioning node 17 may use the LPP annex (LPPa) protocol to communicate with the first radio network node 12, including getting information related to positioning signal configuration from the first radio network node 12, sending measurement command to the first radio network node 12 and receiving measurement results from the first radio network node 12. In case of UTRAN either a Radio Network Controller (RNC) calculates the UE position information or the RNC requests the positioning from a Stand-Alone SMLC (SAS) entity. The positioning protocols used to request position from the positioning node 17, e.g. LPP in case of LTE, operate on a transaction basis, which means that a request-response exchange is executed between a client requesting the position of the UE 10 and the positioning node 17 providing the positioning response.

Examples of positioning methods are:

Enhanced Cell ID (E-CID) and Adaptive E-CID (A-CID): E-CID methods rely primarily on network side measurements, i.e. at the first radio network node 12, such as Time Alignment (TA) measurements or Angle of Arrival (AoA) measurements, potentially combined with UE side radio measurements, i.e. at the UE 10, such as Received Signal Strength Indicator (RSSI), Reference Signal Received Power (RSRP), Reference Signal Received Quality (RSRQ). In case of A-CID, the above measurements may be combined with satellite based positioning, when available, in order to increase accuracy.

Observed Time Difference of Arrival (OTDOA): This method relies on the UE 10 to perform time difference measurements from multiple cells, e.g. the first cell 11, the second cell 14 and the third cell 16, each of these time difference measurements results in a hyperbola corresponding to possible UE positions along the hyperbola. The position of the UE 10 is obtained by taking the intersection of these hyperbolas. Note that knowledge about the offset of time synchronization between the measured cells is also needed in order to be able to draw the hyperbolas as well as the locations of the radio base stations of the different cells.

Global Navigation Satellite System (GNSS) and/or Assisted-GNSS (A-GNSS): These methods are using satellite based positioning, e.g. typically Global Positioning System (GPS) with or without assistance data from the network. Assistance data may accelerate the time to find the satellites at the given location and thereby decrease the delay until a first position is obtained.

The first two methods are radio communications network based positioning solutions with and without UE assistance, while the third one is UE based positioning with possible assistance from the network.

Tracing:

The radio communications network 1 further supports the possibility to trace a particular subscriber and/or the UE 10 throughout its lifetime in the radio communications network 1, where the UE 10 for tracing may be selected based on: user identity, e.g. IMSI based trace; terminal identity e.g. IMEI based trace; or based on location e.g. cell trace. During tracing all network activities related to the particular UE 10 are logged and analyzed in a network management node 19, such as a Trace Collector Entity (TCE).

A Trace Session may be activated in the first radio network node 12 when the first radio network node 12 receives a TRACE START, INITIAL CONTEXT SETUP REQUEST or HANDOVER REQUEST message with the Information Element (IE) Trace Activation indicated from the MME 18 and/or if some activities have been started on interfaces that have been requested to be traced.

The TRACE START, INITIAL CONTEXT SETUP REQUEST or HANDOVER REQUEST message that is received from the MME 18 may comprise the following information: Trace Reference; Trace Recording Session Reference; Trace Depth; List of interfaces for radio network nodes; IP address of the Network Management node 19 and/or similar.

When the Trace Session is activated, parameters of the trace configuration e.g. Minimization of Drive Test (MDT) are added into a message for the UE 10. For IMSI and/or IMEI Software Version (SV) based UE selection, or IMSI/IMEI(SV) combined with geographical area based UE selection, UE performance measurements activation request is propagated to the UE 10.

This mechanism works for the following input parameters: IMSI only, IMSI and area information, IMEI Software Version (SV) only, or IMEI (SV) and area information.

After the UE 10 is attached to the radio communications network 1, the MME 18 may forward the trace configuration such as a MDT configuration, to the corresponding first radio network node 12 which serves the UE 10.

According to embodiments herein the first radio network node 12 obtains positioning data, e.g. one or more positioning measurements, from the UE 10. The first radio network node 12 associates the obtained positioning data with an on-going trace session of the UE 10. The first radio network node 12 then sends a trace record to the network management node 19, which trace record comprises information associated with the positioning data such as the obtained positioning measurement. Thus, the first radio network node 12 may collect positioning measurements from the UE 10 without involving the positioning node 17 thereby enabling more advanced network optimization and performance observation use cases in an efficient manner. In some embodiments this is implemented by adding an LPP protocol proxy functionality into the first radio network node 12. The LPP protocol proxy functionality remains transparent for the UE 10 and for the positioning node 17, i.e., no changes are needed in the UE 10 nor in the positioning node 17. To trigger a reporting of a positioning measurement either in the UE 10 or in the first radio network node 12, the reception of the trace configuration may be used, instead of initiation from the positioning node 17. The positioning measurement results are delivered to the network management node 19 via trace records together with the result of a trace measurement. The trace measurement may also be referred to as a UE network performance measurement initiated by a trace request e.g. a MDT measurement.

Embodiments herein disclose procedures for collecting positioning measurements from the UE 10 and/or the first radio base station 12, in combination with trace measurements, including the triggering, configuration and collection of these measurements. By associating these measurements in the first radio network node 12 more advanced network optimization and performance observation use cases may be performed enhancing the monitoring of the radio communications network in an efficient manner.

Figure 2:
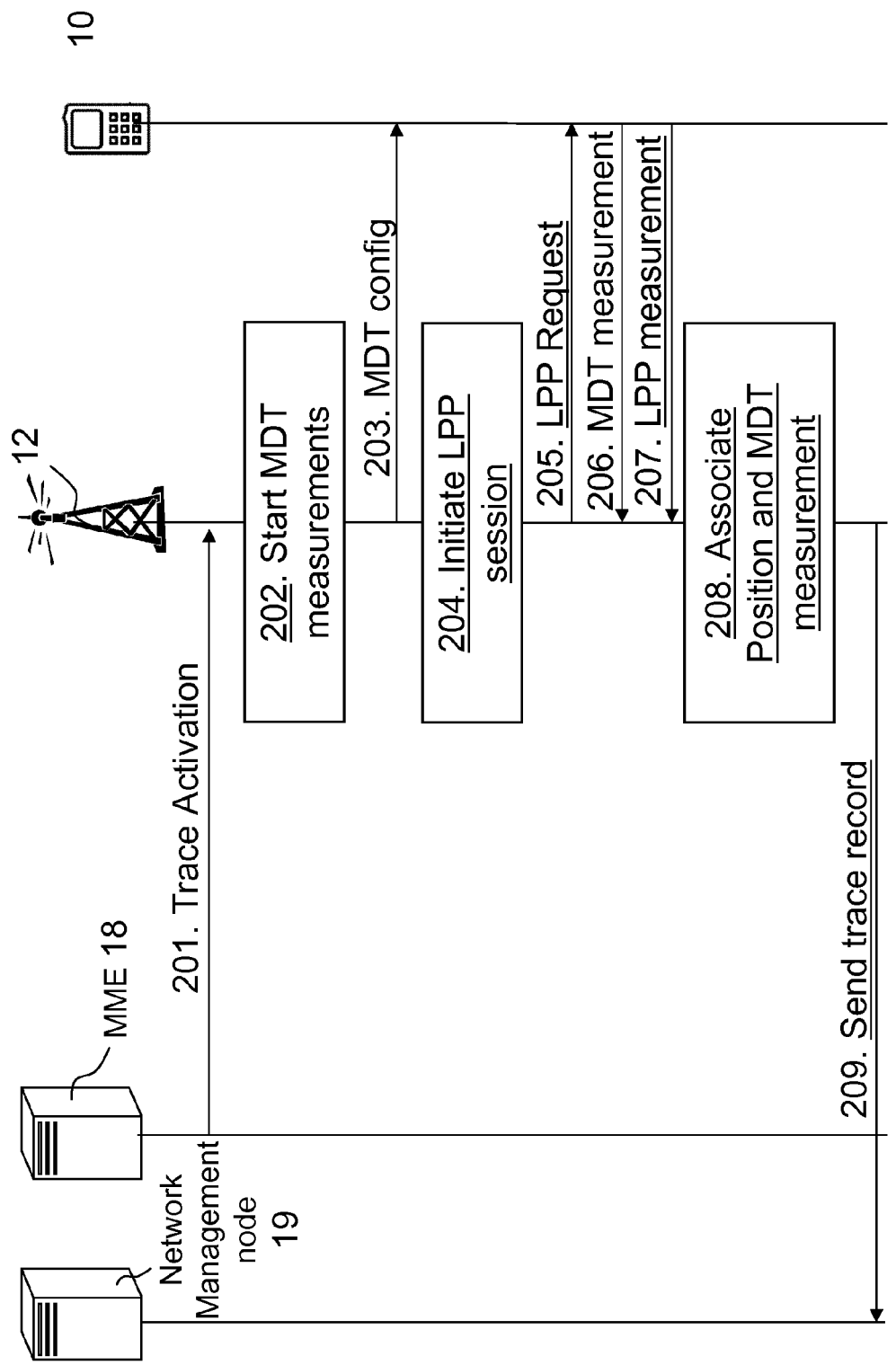
FIG. 2 is a combined flowchart and signaling scheme depicting embodiments herein.

FIG. 2 is a combined flowchart and signaling scheme depicting some embodiments in the radio communications network 1. The triggering of positioning measurement collection via a trace procedure exemplified as a MDT trace procedure is illustrated in FIG. 2, for the case of IMSI and/or IMEI based trace, i.e., signaling based trace activation. Messages and node actions that are new as compared to the legacy procedure are dashed underlined in the FIG. 2. It should be noted that the actions do not have to be taken in the order stated below, but may be taken in any suitable order.

Action 201. The MME 18 transmits an activation of a trace session of the UE 10. This may be initiated when the UE attaches to the network or similar. An indication that the trace session is to be activated may be transmitted to the first radio network node 12 via e.g. an S1 interface, using e.g. either a Trace Activation message or an Initial UE Context Setup message. In the example of MDT as tracing process, a MDT trace is configured in a Home Subscriber System node (HSS) for a specific IMSI and/or IMEI of the UE 10. The MDT trace may come from an Element Manager node (EM) and a trace configuration sent to the EM may typically come from a Network Manager node (NM) over e.g. a standardized 3GPP interface such as Northbound Interface (Itf-N). The HSS may insert a request for trace configuration data for the specific IMSI and/or IMEI of the UE 10 as subscriber data, which is sent to the MME 18, e.g. when the UE 10 is attached to the network and performs authentication.

Action 202.

The first radio network node 12 starts performing one or more MDT measurements or configures for MDT measurements to be performed, as a response to the received indication of the trace activation.

Action 203.

The first radio network node 12 may e.g. transmit a message indicating MDT configuration to the UE 10. Hence, based on the requested MDT measurements as specified in the trace configuration from the MME 18, the first radio network node 12 may configure necessary RRC measurements in the UE 10. The requested MDT measurements may e.g. be either immediate or logged MDT measurements.

Action 204.

According to some embodiments, the need for positioning measurements, as well as, e.g., a type of required positioning measurements is indicated in the trace configuration. Based on this information the first radio network node 12 may decide to initiate an LPP session with the UE 10 to request the necessary positioning measurements or the first radio network node 12 may request the necessary positioning measurements via RRC signaling. An operator has a possibility, e.g. in action 201 above, to indicate some desired properties of the position related, but not limited to, a type of positioning measurements or positioning method, a periodicity of positioning measurements and an accuracy of position acquisitions. In some areas, for example dense urban, it is desired to obtain more accurate positioning estimates, compared to for example rural. This may be indicated in a number of ways in terms of the likelihood of the UE 10 being within an area, for example the probability that the UE 10 is within a circle of certain size. Further, in some areas it is more desirable that positioning estimates are performed more often, e.g., in high-speed areas. For this reason, the operator may, over Itf-N, express a desired time interval between successive positioning reports. Also, the operator may specify the UE population being subject to positioning. This may be expressed in terms in absolute numbers of percentage of total number of UEs. Furthermore, a density of positioned UEs may vary over the area, i.e., in some areas more UEs are positioned. Overall, the positioning accuracy, time interval between successive positioning reports, and number of positioned UEs facilitates a trade-off between amount and accuracy of trace data, and the signaling overhead caused by positioning.

Action 205.

The first radio network node 12 transmits a request for positioning measurements to the UE 10, e.g. by transmitting an LPP request or RRC measurement request, in order to position a UE/network performance. The first radio network node 12 may also distribute any assistance data that the UE 10 might require to perform the positioning measurements, e.g., the time-frequency location of positioning reference signals in the first cell 11 and in neighbor cells 14,16. The first radio network node may request and receive the assistance data from the positioning node 17 via LPPa protocol signaling or it can receive the assistance data from the management node 19. In yet another alternative, the UE 10 can request the assistance data from the positioning node via LPP protocol signaling, in response to receiving a positioning measurement request from the first radio network node 12. It should be noted that the positioning measurements may include not only measurements at the UE 10 but also measurements at the first radio network node 12. These measurements at the first radio network node 12 may be the same as those positioning measurements that may normally be requested by the positioning node 17 from the first radio network node 12 via the LPPa protocol.

Action 206.

The UE 10 starts reporting trace measurements e.g. by transmitting a MDT measurement as indicated in the received MDT configuration.

Action 207.

The UE 10 transmits positioning data such as a report of a LPP positioning measurement.

Action 208.

The first radio network node 12 associates the trace measurement with the positioning measurement enabling an efficient monitoring of measurements in relation to position of UEs. Thus, the first radio network node 12 collects the received measurements and put them into the appropriate trace record, either one each or one for all measurements. The trace records may be identified by the trace session reference and trace recording session reference corresponding to the traced UE. In some embodiments the first radio network node 12 may need to align the configuration of MDT measurements and the positioning measurements, e.g., their periodicity of reporting. Furthermore, the first radio network node 12 may in some embodiments perform positioning measurements on received signals, also defined as positioning data, from the UE 10.

Action 209.

The first radio network node 12 then sends the trace record or records to the network management node 19. The UE position may be calculated in the network management node 19 or NM during post processing and the location information, i.e. the position, may be time correlated to the MDT measurements. The operator may then analyse the MDT measurement associated to the position of the UE 10 to e.g. determine performance at certain time/areas.

Figure 3:
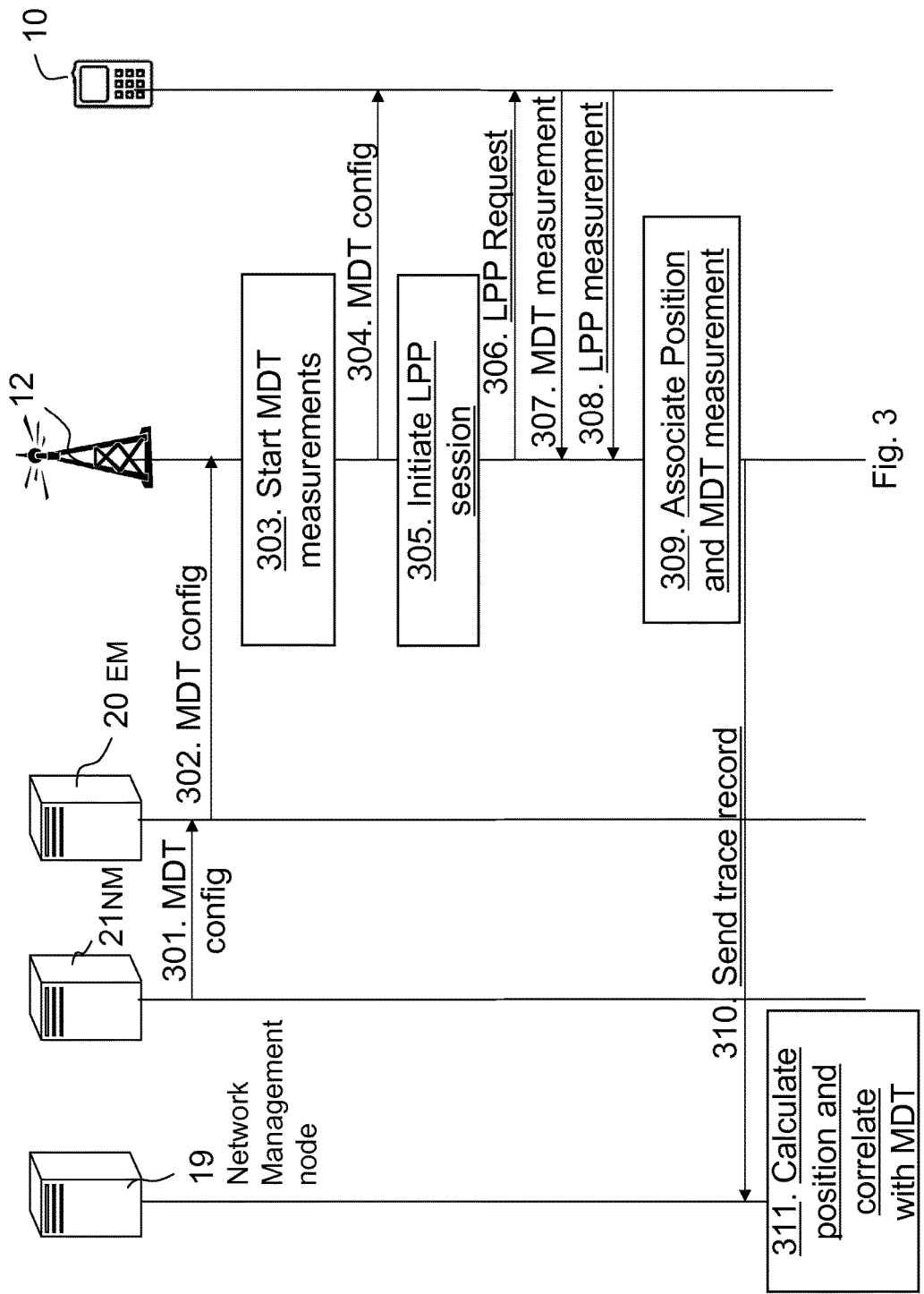
FIG. 3 is a combined flowchart and signaling scheme depicting embodiments herein.

FIG. 3 is a combined flowchart and signaling scheme depicting some other embodiments in the radio communications network 1. A procedure for a cell traffic trace activation, also called management based activation, is shown in FIG. 3. Also in this figure the trace measurements are exemplified as MDT measurements. Messages and node actions that are new as compared to the legacy procedure are dashed underlined in the FIG. 3. It should be noted that the actions do not have to be taken in the order stated below, but may be taken in any suitable order.

Action 301.

An Element Manager node (EM) 20 receives the MDT configuration data transmitted from a Network Manager node (NM) 21 via an Itf-N when e.g. the UE 10 is attached to the radio communications network 1.

Action 302.

The EM 20 transmits the MDT configuration to the radio network node 12. The difference compared to the IMSI and/or IMEI based activation in FIG. 2 is that the activation for trace is received by the first radio network node 12 directly from the EM 20 and not via the MME 18. In response to receiving the trace configuration, the first radio network node 12 may activate the MDT measurement collection, as well as, the LPP based positioning measurement collection for all UEs, or all eligible UEs, in the first cell 11. The actions below correspond to the corresponding actions in FIG. 2.

Action 303.

The first radio network node 12 starts performing MDT measurements or configures for MDT measurements to be performed in response to receiving the trace configuration.

Action 304.

The first radio network node 12 may e.g. transmit a message indicating MDT configuration to the UE 10. Hence, based on the requested MDT measurements as specified in the trace configuration from the MME 18, the first radio network node 12 may configure the necessary RRC measurements in the UE 10. The requested MDT measurements may e.g. be either immediate or logged MDT measurements.

Action 305.

According to some embodiments, the need for positioning measurements, as well as, e.g., the type of required positioning measurements is indicated in the trace configuration. Based on this information the first radio network node 12 may decide to initiate an LPP session with the UE 10 or to send RRC measurement configuration to request the necessary positioning measurements. An operator has a possibility, e.g. in action 301 above, to indicate some desired properties of the position related, but not limited to, a type of positioning measurements or positioning method, a periodicity of positioning measurements and an accuracy of position acquisitions. In some areas, for example dense urban, it is desired to obtain more accurate positioning estimates, compared to for example rural. This may be indicated in a number of ways in terms of the likelihood of the UE 10 being within an area, for example the probability that the UE 10 is within a circle of certain size. Further, in some areas it is more desirable that positioning estimates are performed more often, e.g., in high-speed areas. For this reason, the operator may, over Itf-N, express the desired time interval between successive positioning reports. Also, the operator may specify the UE population being subject to positioning. This may be expressed in terms in absolute numbers of percentage of total number of UEs. Furthermore, the density of positioned UEs may vary over the area, i.e., in some areas more UEs are positioned. Overall, the positioning accuracy, time interval between successive positioning reports, and number of positioned UEs facilitates the trade-off between amount and accuracy of trace data, and the signaling overhead caused by positioning. Also trace configuration may be configured from the operator.

Action 306.

The first radio network node 12 transmits a request for positioning measurements to the UE 10, e.g. by transmitting an LPP request or RRC measurement configuration. The first radio network node 12 may also distribute any assistance data that the UE 10 might require to perform the positioning measurements, e.g., the time-frequency location of the positioning reference signals in the first cell 11 and in neighbor cells 14,16. The first radio network node 12 may request and receive the assistance data from the positioning node 17 via LPPa protocol signaling or it can receive the assistance data from the management node 19. In yet another alternative, the UE 10 can request the assistance data from the positioning node via LPP protocol signaling, in response to receiving a positioning measurement request from the first radio network node 12. It should be noted that the positioning measurements may include not only measurements at the UE 10 but also measurements at the first radio network node 12. These measurements at the first radio network node 12 may be the same as those positioning measurements that may normally be requested by the positioning node 17 from the first radio network node 12 via the LPPa protocol.

Action 307.

The UE 10 starts reporting trace measurements e.g. by transmitting a MDT measurement, in response to the received MDT configuration.

Action 308.

The UE 10 transmits e.g. a LPP positioning measurement in a measurement report.

Action 309.

The first radio network node 12 associates the trace measurement with the positioning measurement. Thus, the first radio network node 12 collects the received measurement reports and put them into the appropriate trace record, either one each or one for all measurements. The trace records may be identified by the trace session reference and trace recording session reference corresponding to the traced UE 10. In some embodiments the first radio network node 12 may need to align the configuration of MDT measurements and the positioning measurements, e.g., their periodicity of reporting. Furthermore, the first radio network node 12 may in some embodiments perform positioning measurements on received signals, also defined as positioning data, from the UE 10.

Action 310.

The first radio network node 12 then sends the trace record or records to the network management node 19.

Action 311.

The network management node 19 may calculates position of the UE 10 and correlates the position in time with the trace measurement, such as the MDT measurement. As stated above, the operator may then analyse the MDT measurement associated to the position of the UE 10 to e.g. determine performance at certain time/areas.

Figure 4:
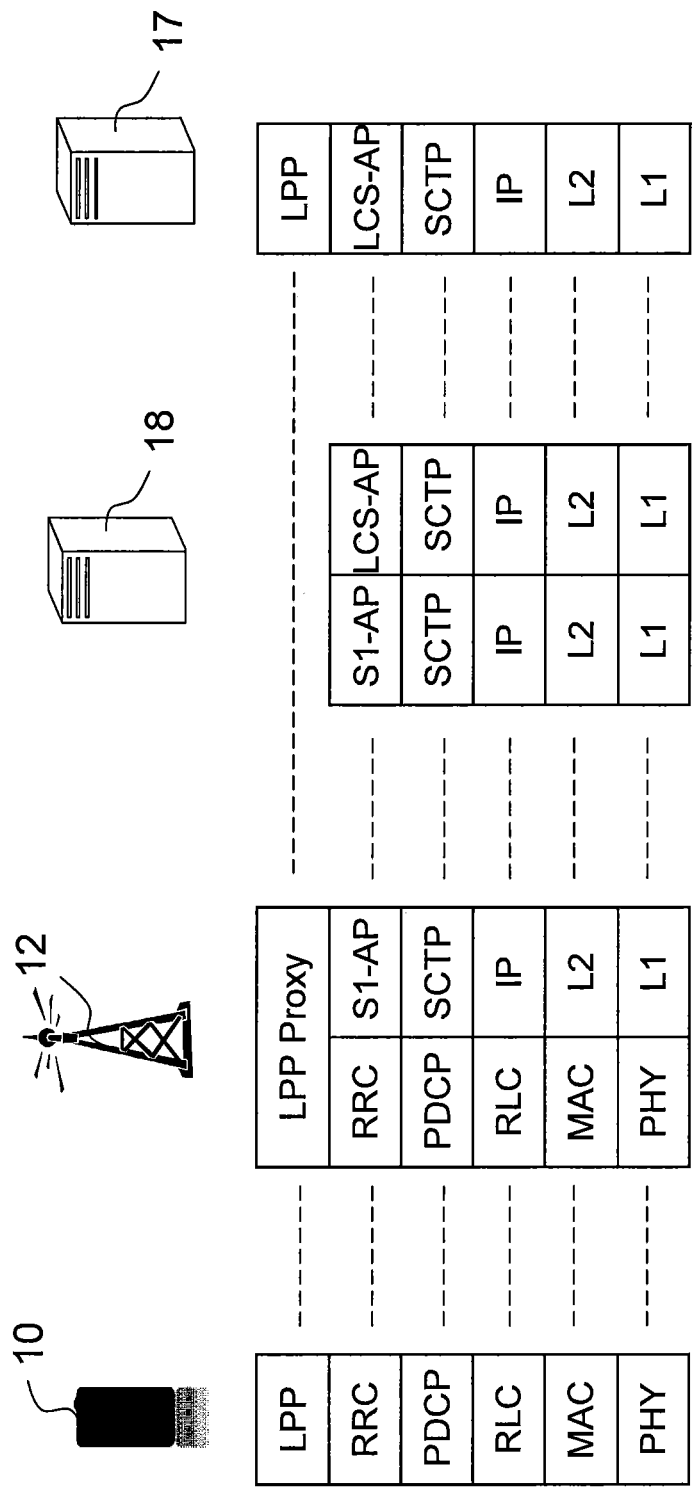
FIG. 4 is schematic protocol stacks according to embodiments in the radio communications network.

FIG. 4 is a block diagram depicting protocol stacks in the different nodes in the radio communications network 1. The LPP protocol is a point-to-point transaction based protocol, where an LPP session comprises one or multiple transactions and each transaction is identified by its unique transaction ID. An LPP session is typically associated with one positioning request and may include multiple transactions to transfer position related measurements, assistance data or position estimates. A last message sent in each transaction is labeled with an end marker flag. A first message opens a positioning session and the last message with the end marker flag closes the positioning session. The messages within a transaction are assigned sequence numbers to detect duplicates or message losses. Embodiments herein introduce a LPP proxy functionality into the first radio network node 12. The introduced LPP-proxy functionality in the first radio network node 12 has two main functionalities:

Transparent forwarding of LPP messages between the positioning node 17 and the UE 10 with the possibility of interpreting the messages. This allows the first radio network node 12 to read out the positioning measurement from the LPP messages, which are originally destined for the positioning node 17, before forwarding them toward the positioning node 17. The corresponding protocol architecture is shown in FIG. 4.

Initiating LPP messages toward the UE 10 to support that the first radio network node 12 may request LPP positioning measurements from the UE 10.

The protocol stack in the UE 10 comprises a Physical layer (PHY) as the first layer, a Medium Access Control (MAC) layer, a Radio Link Control (RLC) layer, a Packet Data Convergence Protocol (PDCP) layer, Radio Resource Control (RRC) layer, and an LTE Positioning Protocol (LPP) layer.

It is illustrated in FIG. 4 an end-to-end protocol architecture between the UE 10 and and the positioning node 17 with the LPP proxy functionality in the first radio network node 12. As shown, the first radio network node 12 communicates with the UE 10 carrying data of the different layers, i.e. PHY, MAC, RLC, PDCP, RRC, and LPP. The different layers are repacked into layers over a S1-MME interface to be communicating with the MME 18. The PHY is carried over a layer denoted as Layer 1 (L1) which is a physical layer, the MAC is carried over a layer denoted as Layer 2 (L2) being a data link layer, the RLC is carried over an Internet Protocol (IP) layer as the network layer, and the PDCP layer is carried over a Stream Control Transmission Protocol (SCTP) which is a transport layer protocol. The RRC layer is carried over S1 Application Protocol (S1-AP) layer. The LPP proxy in the first radio network node 12 transparently forwards LPP messages.

When transparently forwarding the LPP messages the LPP-proxy functionality may have some of following functionalities:

The first radio network node 12 may transparently forward the LPP messages between the positioning node 17 and the UE 10 without modifying a content of the message.

The first radio network node 12 may interpret the messages, e.g., interpreting a type of measurements that are requested by the positioning node 17. The first radio network node 12 may also capture bypassing measurement reports from the UE 10. Since the LPP proxy functionality has read the positioning measurement configuration before, the LPP proxy functionality is able to interpret the positioning measurement results.

The LPP proxy functionality of the first radio network node 12 may make a copy of the positioning measurement when receiving the positioning measurement. The LPP proxy functionality may further associate the positioning measurement with a trace context of the UE 10 and send the positioning measurement as part of the trace record to the network management node 19. At the same time the LPP proxy functionality may also transparently forward the original received positioning measurement toward the positioning node 17.

In case the LPP-proxy functionality of the first radio network node 12 acts as an initiator of positioning measurements, it may have the following functionalities:

The LPP-proxy functionality may initiate an LPP session with the UE 10, for instance, in response to the trigger of the trace configuration. The LPP-proxy functionality may also send any necessary assistance data to the UE 10. The LPP-proxy functionality may send and/or receive any of the standard LPP messages.

The LPP-proxy functionality may receive the positioning measurement from the UE 10, put the positioning measurement in a corresponding trace record and send the trace record to the network management node 19.

The LPP-proxy functionality in a source radio base station, e.g. the first radio network node 12, may transfer a context of an on-going LPP session to a target radio base station, e.g. the second radio network node 13 in order for the LPP session to be continued uninterruptedly. Context comprises positioning measurement configuration, positioning measurements, association to trace configuration and similar.

As illustrated the MME 18 is merely working with layers up to the S1-AP layer, i.e., the L1 μL2, IP, SCTP layers. The S1-AP layer is carried over Location Service Application Protocol (LCS-AP) layer. The positioning node 17 communicates with the UE 10 or the first radio base station 12 over the L1 μL2, IP, SCTP, LCS-AP and the LPP, which LPP is transparently received from and/or transmitted to the UE 10.

Embodiments herein enable to reuse the existing LPP protocol to collect positioning measurements in the first radio network node 12 to be sent to a management system for purposes of trace measurement localization. A benefit of this is that it remains transparent for the UE 10 and the positioning node 17, being the original endpoints of LPP communications. The LPP-proxy functionality in the first radio network node 12 introduces only minor extra complexity for implementation in the first radio base station 12.

Figure 5:
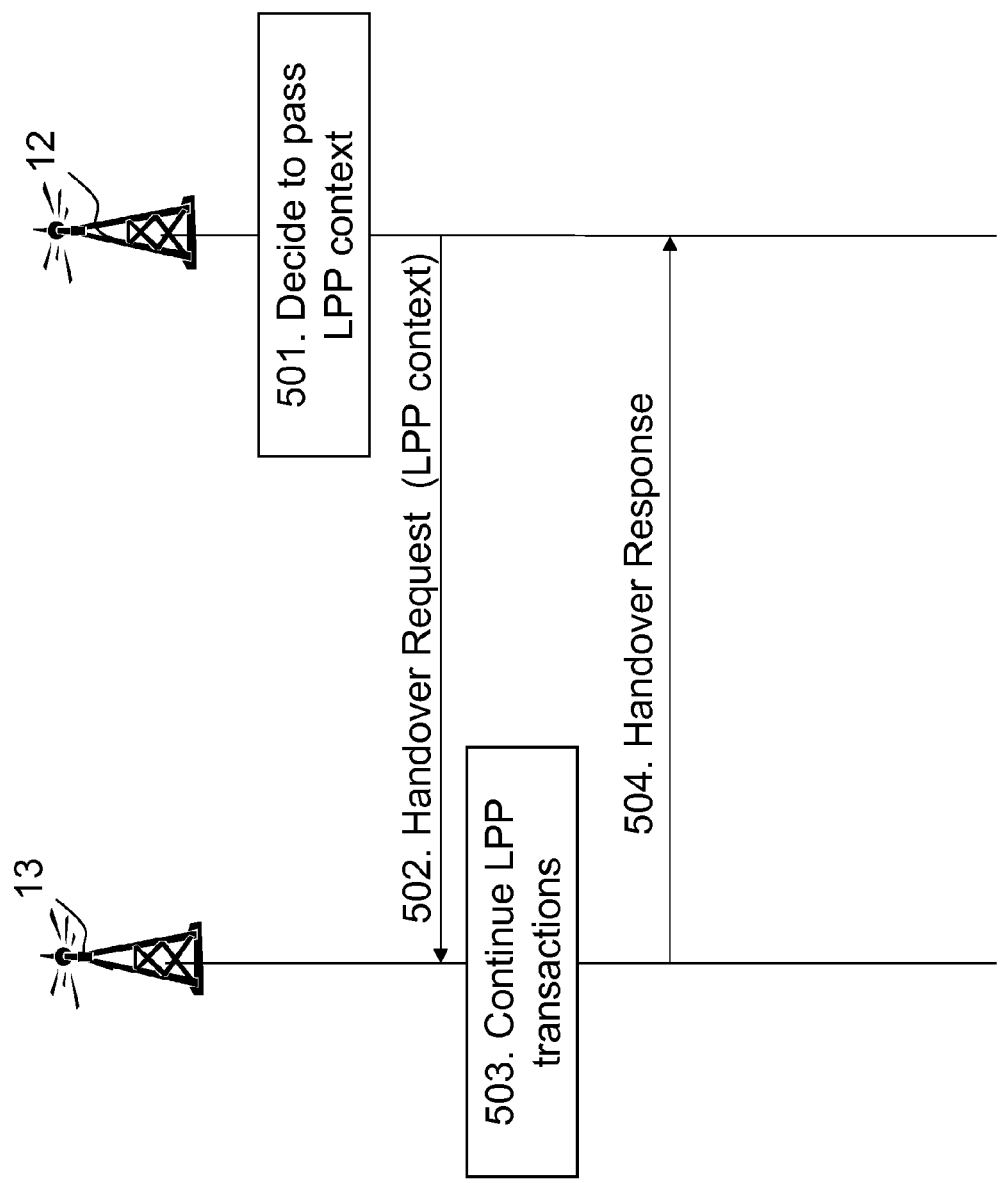
FIG. 5 is a combined flowchart and signaling scheme depicting embodiments herein.

FIG. 5 is a combined flowchart and signaling scheme depicting embodiments herein. If a subscriber or the UE 10 which is traced makes a handover to a, e.g. the second radio network node 13, using an X2 interface, the first radio network node 12, propagates the trace configuration further to the second radio network node 13 by using a Handover Request message. When the second radio network node 13 receives the Handover Request message it may immediately start a Trace Session according to the trace configuration received in the Handover Request message. Since the UE 10 may change cell while MDT measurements and LPP positioning measurement are ongoing, there the LPP-proxy functionality may be relocated from the first radio network node 12 to the second radio network node 13.

Action 501.
The first radio network node 12 decides to pass the positioning measurement configuration, e.g. LPP context, to the second radio network node 13 when a handover is detected.

Action 502.
The first radio network node 12 transmits the positioning measurement configuration e.g. as the LPP context in a Handover Request, to the second radio network node 13.

Action 503.
The second radio network node 13 continues existing LPP sessions and/or transactions using the received context of the LPP configuration, also called LPP proxy context.

Action 504.
The second radio network node 13 may then confirm handover by transmitting a Handover Response.

Figure 6:
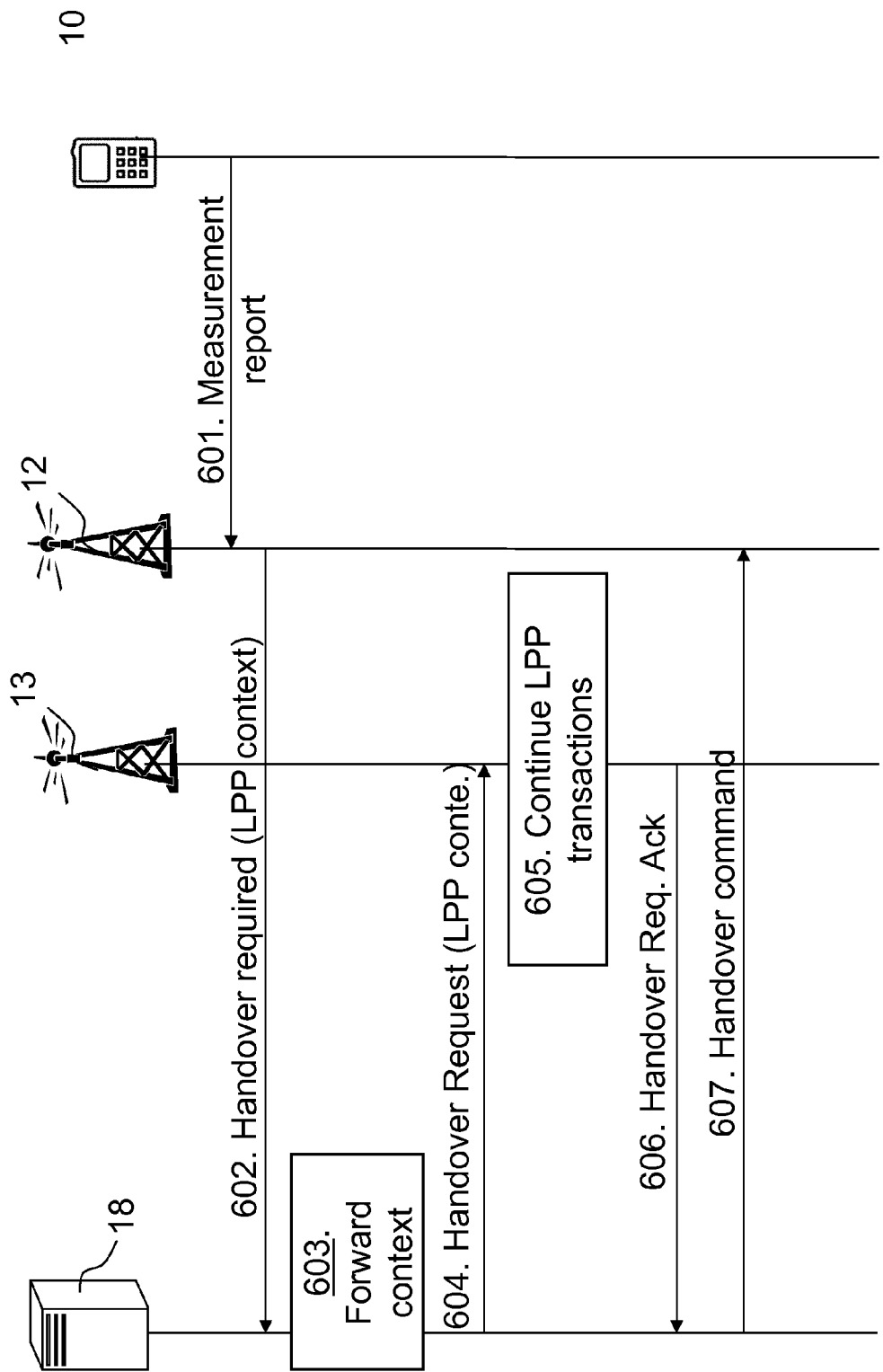
FIG. 6 is a combined flowchart and signaling scheme depicting embodiments herein.

FIG. 6 is a combined flowchart and signaling scheme depicting embodiments herein. If the UE 10, which is traced, makes a handover to the second radio network node 13 using an S1 interface. It is the MME's 18 responsibility to propagate the trace configuration to the second radio network node 13.

Action 601.
The UE 10 transmits a measurement report of signal strength of difference cells indicating a handover to a target cell, e.g. the second cell 14.

Action 602.
The first radio network node 12 determines that a handover is to be performed and transmits a Handover required to the MME 18 controlling the first radio network node 12. The positioning measurement configuration, e.g. LPP context, is also transferred in the Handover required to the MME 18.

Action 603.
The MME 18 transparently forwards the contexts, e.g. both the trace context and the LPP context, to the second radio base station 13.

Action 604.
For example, the MME 18 transmits a Handover Request to the second radio network node 13 carrying the LPP context and also the trace context.

Action 605.
The second radio network node 13 continues existing LPP sessions and/or transactions using the received context of the LPP configuration, called LPP proxy context.

Action 606.
The second radio network node 13 may confirm handover by transmitting a Handover Request Acknowledgement (ACK).

Action 607.
The MME 18 may then transmit a Handover Command back to the first radio network node 12 confirming handover.

The positioning measurement configuration, such as LPP-proxy context, transfer described in FIGS. 5 and 6 may apply primarily for signaling based MDT tracing, i.e., IMSI and/or IMEI based, where the trace configuration anyway needs to be passed between the radio base stations 12,13. In case of management based MDT trace, i.e., cell tracing, there is no trace context transfer as the MDT measurements apply only in the cell that has configured the measurements. However, the transfer of LPP-proxy context may be needed in this case as well, similarly to the transfer of trace context, in order to make the second radio network node 13 aware of any on-going positioning measurement configuration at the UE 10. The second radio network node 13 may cancel unnecessary measurements by sending an LPP abort message to the UE 10, e.g., when the first radio network node 12 could not delete these positioning measurements prior to the handover.

The first radio network node 12 may in FIGS. 5 and 6 have the following options to act at a detected handover:

The first radio network node 12 may stop all ongoing LPP transactions, which are on-going between the UE 10 and the first radio network node 12, but not impacting any on-going transaction between UE 10 and the positioning node 17, before the handover by sending an LPP Abort message. In this case there is no need to transfer the LPP context.

A drawback is that there might not be always possible to send the LPP Abort message before the handover is actually executed or a connection is lost. Moreover, the second radio network node 13 may need to reinitiate and configure LPP connections again, when MDT measurements are to be collected in the target cell, e.g. determined by MDT area selection criteria.

Another option is to forward the LPP context of those LPP transactions that have been initiated by the first radio network node 12 and are still on-going, i.e., the transaction has not yet been closed by receiving an end marker flag. In this case the first radio network node 12 may continue with the existing configuration, if MDT measurement collection is to be continued in the target cell, which is determined by e.g. MDT area selection criteria. If MDT measurements are not needed in the target cell the first radio network node 12 may stop on-going LPP transactions by sending the LPP Abort message.

In a third option the first radio network node 12 may pass the context of not only those LPP transactions that have been initiated by the first radio network node 12 but also the context of LPP transactions that are on-going between the UE 10 and the positioning node 17. The positioning context may have been established in the first radio network node 12 by sniffing the communication between the UE 10 and the positioning node 17.

The transferred LPP context may comprise: a transaction identifier of open transactions; a positioning measurement configuration related to open transactions e.g., what is reported, periodicity of reporting, etc.; and time stamp information.

Figure 7:
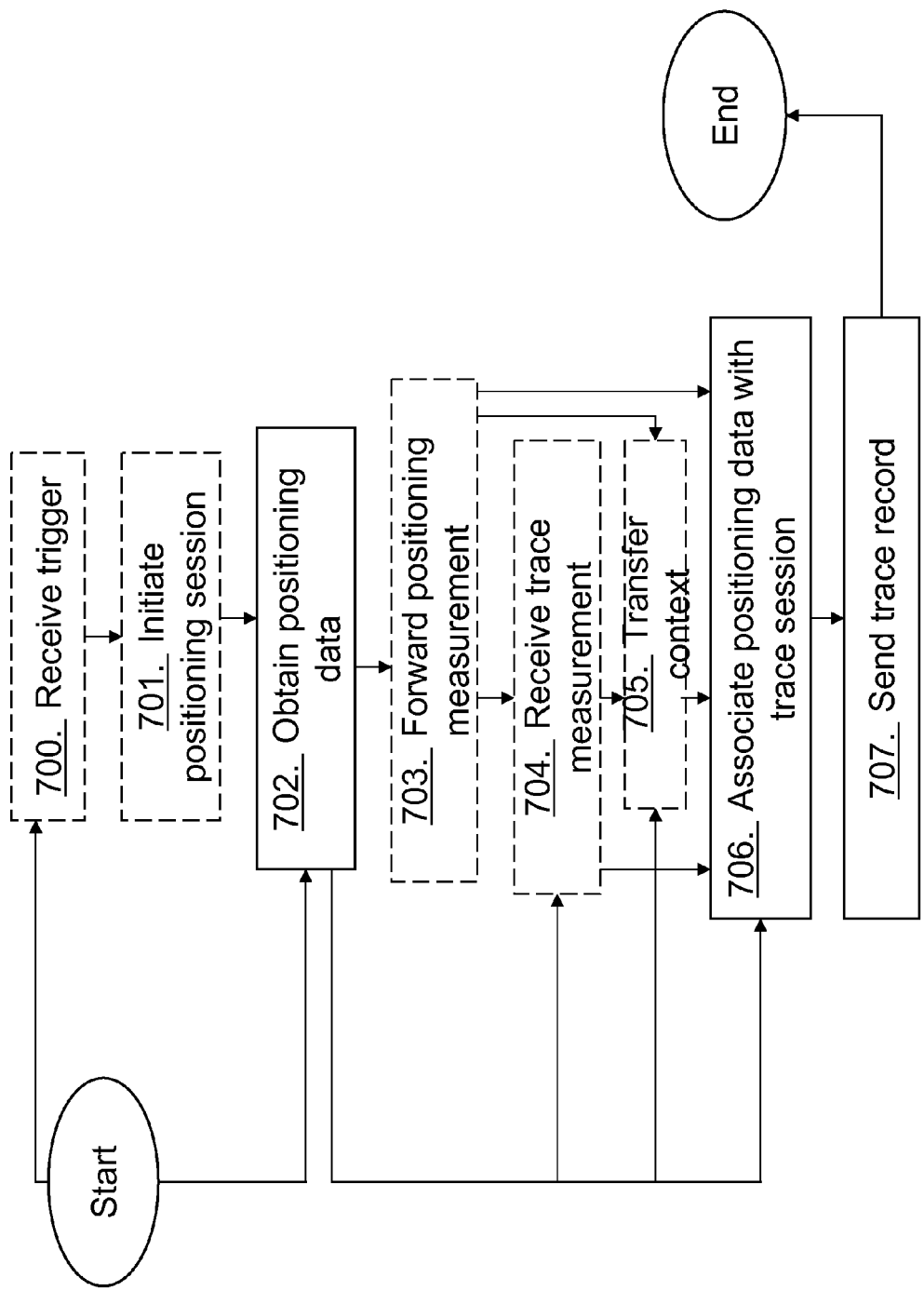
FIG. 7 is a schematic flowchart depicting embodiments of a method in a radio network node.

The methods in the radio network node 12, exemplified above as the first radio network node 12 in the figures, for handling positioning data in the radio communications network 1 according to some embodiments will now be described with reference to a flowchart depicted in FIG. 7. The actions do not have to be taken in the order stated below, but may be taken in any suitable order. The radio network node serves the UE 10 in the cell 11. Actions that are only performed in some embodiments are marked as dashed boxes.

Action 700.

The radio network node 12 may receive a trigger, from a network node, such as the MME 18 or the Element Manager node 20, for activating a trace configuration for a trace session.

Action 701.

The radio network node 12 may initiate, when receiving the trigger, a positioning session of the UE 10 e.g. as part of a positioning protocol proxy functionality in the radio network node 12 such as an LPP proxy functionality. Thus, embodiments herein initiate e.g. LPP messages toward the UE 10 to support the radio network node 12 when requesting LPP positioning measurements from the UE 10. The LPP-proxy functionality may initiate an LPP session with the UE 10, for instance, in response to the trigger of an MDT configuration. The LPP-proxy functionality may also send any necessary assistance data to the UE 10. Thus, the radio network node 12 may transmit assistance data for positioning to the UE 10. The radio network node 12 may obtain the assistance data from the positioning node 17 or from the network management node 19. The user equipment 10 may in some embodiments request the assistance data from the positioning node 17.

In an alternative embodiment, the positioning protocol proxy functionality in the radio network node 12 may use the Radio Resource Control (RRC) protocol to request and collect positioning measurements from the UE 10. In this case, any assistance data needed for the positioning measurements are sent with the RRC protocol to the UE 10. Thus, in some embodiments the initiating of the positioning session is signaled via the RRC protocol.

In some embodiments a duration of the positioning session is equal to a duration of the trace session, e.g. pre-set time period. The trace configuration may indicate a type of positioning measurement, accuracy of the positioning measurement, and/or periodicity of the positioning measurement to initiate.

Action 702.

The radio network node 12 obtains positioning data from the UE 10. The positioning data is associated with a positioning measurement for positioning the UE 10. Positioning data may comprise geographical location, positioning measurements such as signal strengths and times; but also signals received from the UE 10 on which positioning measurements are performed measured at the radio network node 12. The positioning measurement may comprise a Long Term Evolution Positioning Protocol measurement In some embodiments, the radio network node 12 may obtain the positioning data by intercepting an on-going positioning session between the UE 10 and the positioning node 17 and by retrieving the positioning data in the form of a positioning measurement from the intercepted on-going positioning session. For example, in cases when there is an LPP session already ongoing between the UE 10 and the positioning node 17, e.g., due to some location based services running in the UE 10 and requiring localization, there is possibility to optimize these positioning measurements with trace measurements needed for MDT localization. This means that the radio network node 12 does not necessarily has to request similar or same measurements from the UE 10 in parallel of already requested measurements by the positioning node 17 but the radio network node 12 may intercept the already reported positioning measurements and use them for MDT localization purposes, e.g. putting the positioning measurements into the trace record and send them to the network management node 19. Such an optimization and coordination between positioning node originated and radio network node 12 originated LPP measurements may be considered as an enhancement of baseline embodiments and may not be used in all cases.

In order to perform the coordination between positioning node originated measurements and MDT localization measurements, the radio network node 12 may have the following functionality: the radio network node 12 may maintain its own state information of the ongoing LPP session and transactions between the UE 10 and the positioning node 17 by sniffing into a bypassed LPP message. That means, the radio network node 12 may follow the open transactions, the positioning measurement configurations and the reported measurement results between the UE 10 and the positioning node 17. When a request for a MDT trace measurement with localization is received, the radio network node 12 is aware of the already on-going localization and/or positioning measurements requested by the positioning node 17 and may utilize these positioning measurements for MDT purposes or it may request only a "delta" information that might be needed for MDT localization, e.g., other type of measurements or higher periodicity, etc. The LPP-proxy functionality in the radio network node 12 may never talk into the communication between the UE 10 and the positioning node 17, i.e., it shall never modify or inject new messages. The radio network node 12 may, however, always initiate a new transaction with a new transaction ID with the UE 10, if the radio network node 12 needs more measurements. Opening additional transactions may be tolerated by the UE 10, as the UE 10 will not notice that certain transactions are originating from the radio network node 12 instead of the positioning node 17.

In some embodiments the radio network node 12 obtains the positioning data by retrieving a configuration signaling message from the positioning node 17. The configuration signaling message comprises configuration data for performing positioning measurements at the UE 10 also referred to as positioning measurement configuration. The radio network node 12 may store the configuration data at the radio network node 12.

Action 703.

The radio network node 12 may forward the retrieved positioning measurement to the positioning node 17 e.g. as part of the positioning protocol proxy functionality in the radio network node 12. Thus, the radio network node maintains a positioning protocol state of the on-going communication between the UE 10 and the positioning node 17.

In some embodiments the retrieved configuration signaling message is forwarded to the UE 10. Thus, when receiving the positioning data in the form of positioning measurement results, the positioning protocol proxy may make a copy of the positioning measurement results, associate the positioning measurement results with trace measurement or trace context of the UE 10 and send the results as part of the MDT trace record to the network management node 19. At the same time the positioning protocol proxy also transparently forwards the original measurement result message toward the positioning node 17. Thus, the radio network node 12 transparently forwards LPP messages between the positioning node 17 and the UE 10 with the possibility of interpreting the messages. Hence, the radio network node 12 may read out the positioning measurement results from the messages, which are originally destined for the positioning node 17, before forwarding them toward the positioning node 17. The radio network node 12 may transparently forward the LPP messages between the positioning node 17 and the UE 10 without modifying the content of the message.

Action 704.

The radio network node 12 may receive a trace measurement of an on-going trace session from the UE 10. The trace measurement is a measurement of a network performance of the UE 10 initiated from a trace session.

In some embodiments the trace configuration specifies a Minimization of a Drive Test measurement as the trace measurement.

One use case of the localization via MDT is to localize radio network measurements or trace measurements by the UE 10. These trace measurements may include, but are not limited to radio resource control measurements of received signal strength and/or quality with respect to serving cell as well as other cells. The trace measurements may also include feedback information on the media access control layer such as channel quality indications, channel rank, and also information about the round-trip time between serving base station and the UE 10. Such measurements may be referred to as trace measurements to differentiate from localization or positioning measurements. Without loss of generality, trace measurements may be performed with one periodicity. Multiple periodicities for different sets of trace measurements may also be considered in a similar manner.

Positioning measurements and trace measurements may be configured completely unaligned, and may be provided to the management network node as two separate time stamped trace records. However, it is also possible to align two such trace records.

Positioning measurement configuration may set the periodicity and that the trace measurements may be included in the trace record if updated since the last positioning time instant.

Positioning measurement configuration may set the periodicity and the trace measurements may be configured by the radio network node 12 to be as aligned in time with the positioning measurement as much as possible.

Positioning measurement configuration may set the periodicity and trace measurements may be interpolated to match the positioning measurement time instants.

Positioning measurement configuration may set the periodicity and trace measurements may be included in the trace record if updated since a last radio measurement time instant.

Trace configuration may set the periodicity and positioning measurements may be configured by the radio network node 12 to be as aligned in time with the trace measurements as possible.

Trace configuration sets the periodicity and the positioning measurements may be interpolated to match the trace measurement time instants.

Action 705.

The radio network node 12 may transfer context of the positioning measurement to a different radio network node 13 of a target cell 14 during a handover procedure.

Action 706.

To enable more advanced network optimization and performance observation use cases in an efficient manner, the radio network node 12 associates the obtained positioning data with an on-going trace session of the UE 10. In some embodiments, the trace measurement received in action 702 may be associated with the positioning data.

Action 707.

The radio network node 12 sends a trace record to the network management node 19. The trace record comprises information associated with the positioning data, e.g. the positioning measurement, a position of the traced UE 10, and/or a positioning measurement performed at the radio network node 12.

In some embodiments the trace measurement and the positioning data is sent in one trace record to the network management node 19, such as the TCE. In some embodiments the obtaining, the sending of the positioning data, the forwarding, and/or the initiating is performed in a positioning protocol proxy functionality comprised in the radio network node 12. For example, an LPP-proxy functionality may receive a positioning measurement result from the UE 10, put the result in the corresponding trace record and send the record to the network management node 19. The radio network node 12 may interpret the messages, e.g., interpreting the type of positioning measurements that are requested by the positioning node 17 and the radio network node 12 may also capture the bypassing positioning measurement reports from the UE 10. Since the positioning protocol proxy has seen the positioning measurement configuration before, it knows how to interpret the measurement results. When receiving the positioning measurement results, the positioning protocol proxy may make a copy of the positioning measurement results, associate the positioning measurement results with the trace context of the UE 10 and send the results as part of the MDT trace record to the network management node 19. At the same time the positioning protocol proxy also transparently forwards the original measurement result message toward the positioning node 17.

Thus, the LPP-proxy functionality in the source radio base station e.g. the radio network node 12 may transfer the context of the ongoing LPP sessions to the second radio network node 13 in order for the session to be continued uninterruptedly.

As it has been mentioned in the introduction there are two types of MDT measurements, immediate MDT, which is taken in connected mode of the UE 10 and logged MDT, which is taken in idle mode of the UE 10. The proposed network based positioning measurement collection may primarily be used for immediate MDT measurements when the UE 10 has a connection to the network. It would, however, be possible to use the same solution to collect positioning measurement for logged MDT mode as well. The positioning measurements may be configured with the same LPP-proxy initiated configuration as in case of immediate MDT, including configuring requested measurements and necessary configuration data.

Then the UE 10 may collect and log the LPP measurements while being in idle mode and report the results in one log record when it comes back to connected mode next time. The duration of the LPP configuration may be tied to the duration of the logged MDT configuration. Note that the duration is anyway a configuration parameter of the logged MDT measurements. The positioning measurement configuration remains active in the UE 10 as long as the logged MDT measurement duration expires or until the logged MDT configuration is overwritten with a new configuration.

Finally, we note that in idle mode, not all positioning techniques may be used as some of them require an active connection to the UE 10, e.g. to be able to perform network side measurements on UE transmission.

Figure 8:
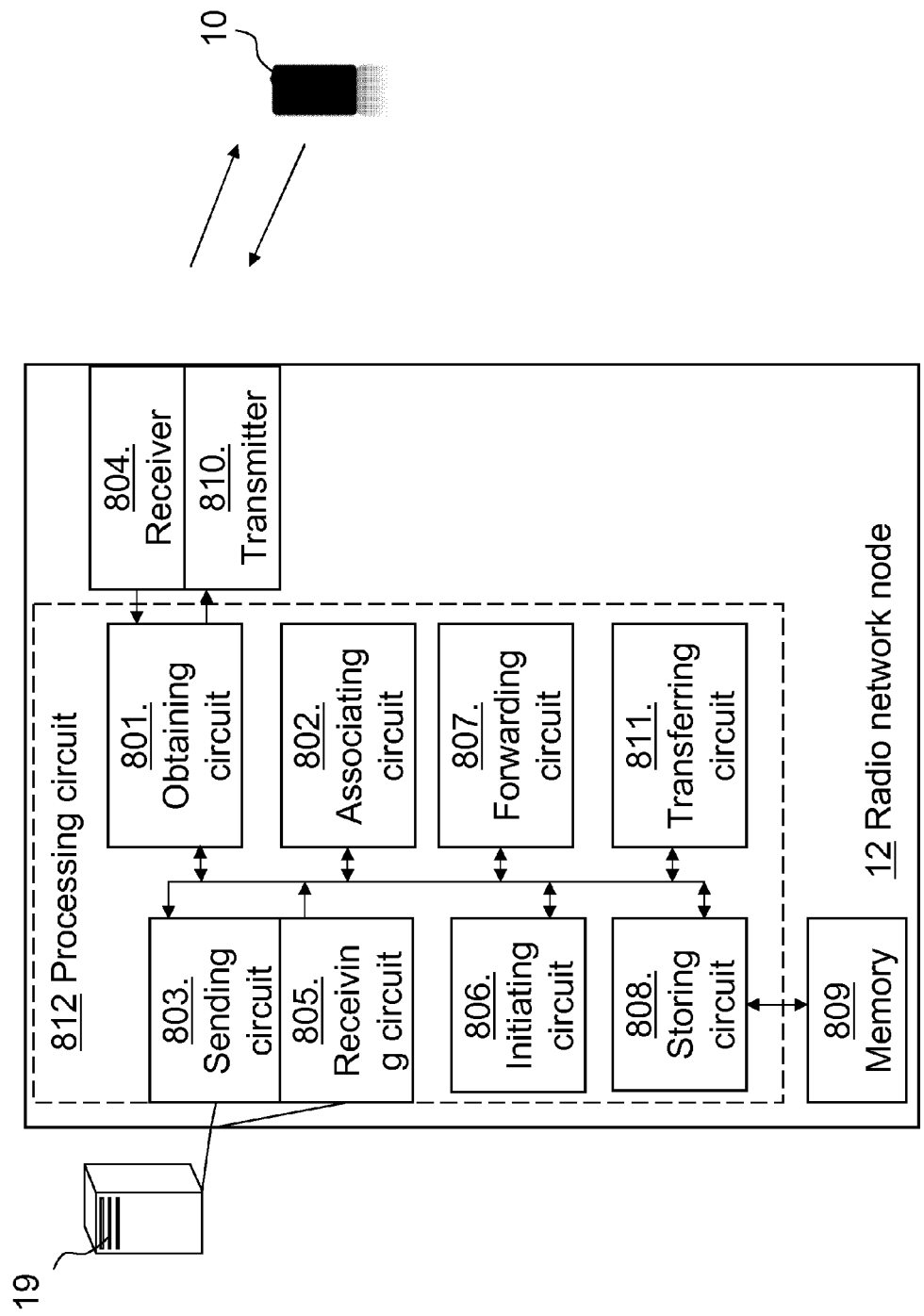
FIG. 8 is a block diagram depicting a radio network node according to embodiments herein.

FIG. 8 is a block diagram depicting the radio network node 12 for handling positioning data in the radio communications network 1 according to embodiments herein. The radio network node 12 serves the UE 10 in the cell 11. The radio network node 12 may be a radio base station.

The radio network node 12 comprises an obtaining circuit 801 configured to obtain positioning data from the UE 10. The positioning data is associated with a positioning measurement for positioning the UE 10 being e.g. a positioning measurement from the UE 10, a geographical reported position, or a signal for the radio network node 12 to perform positioning of the UE 10 on.

The radio network node 12 comprises an associating circuit 802 configured to associate the obtained positioning data with an on-going trace session of the UE 10.

Furthermore, the radio network node 12 comprises a sending circuit 803 configured to send a trace record to a network management node 19. The trace record comprises information associated with the positioning data, e.g. the positioning received measurement, a position of the traced UE 10, and/or a positioning measurement performed at the radio network node 12.

The radio network node 12 further comprises a receiver 804 that in some embodiments is configured to receive a trace measurement of the on-going trace session from the UE 10. The trace measurement is a measurement of a network performance of the UE 10 initiated from a trace session. The associating circuit 802 may in some embodiments be configured to associate the trace measurement with the positioning data, and the sending circuit 803 may be configured to send the trace measurement and the positioning data in one trace record to the network management node 19.

In some embodiments the radio network node 12 comprises a receiving circuit 805 configured to receive a trigger, from a network node such as the MME 18, for activating a trace configuration for a trace session. The trigger may be receiving a trace configuration or similar.

In some embodiments the radio network node 12 comprises an initiating circuit 806 configured to initiate, when the trigger is received at the receiving circuit 805, a positioning session of the UE 10. This initiating process may e.g. be a part of the positioning protocol proxy functionality in the radio network node 12. In some embodiments a duration of the positioning session is equal to a duration of the trace session. The initiating circuit 806 may be configured to initiate the positioning session by signaling via a Radio Resource Control, RRC, protocol.

In some embodiments the trace configuration specifies a Minimization of a Drive Test measurement as the trace measurement. The trace configuration may e.g. indicate a type of positioning measurement, accuracy of the positioning measurement, and/or periodicity of the positioning measurement to initiate.

In some embodiments the obtaining circuit 801 is configured to intercept an on-going positioning session between the UE 10 and a positioning node 17. The obtaining circuit 801 is further then configured to retrieve the data in the form of a positioning measurement from the intercepted on-going positioning session. The radio network node 12 may then further comprise a forwarding circuit 807 configured to forward the retrieved positioning measurement to the positioning node 17 e.g. as part of the positioning protocol proxy functionality in the radio network node 12. In some embodiments the radio network node 12 is configured to maintain a positioning protocol state of the on-going communication between the UE 10 and the positioning node 17.

In some embodiments the obtaining circuit 801 is configured to retrieve a configuration signaling message from the positioning node (17), which configuration signaling message comprises configuration data, also referred to as positioning measurement configuration, for performing positioning measurements at the UE 10. Then the radio network node 12 may further comprise a storing circuit 808 configured to store the configuration data on a memory 809 at the radio network node 12. The forwarding circuit 807 may then be configured to forward the retrieved configuration signaling message to the UE 10. In some embodiments the positioning measurement comprises a LPP measurement. The memory 809 may comprise one or more memory units and may be used to store for example data such as positioning measurements, trace measurements and application to perform the methods herein when being executed on the radio base station 12 or similar. In some embodiments the radio network node 12 may comprise the positioning protocol proxy functionality to obtain, to send the positioning data and/or to initiate the positioning session and/or to forward the positioning measurement or the configuration signaling message.

The radio network node 12 further comprises a transmitter 810 configured in some embodiments to transmit assistance data for positioning to the UE 10.

The radio network node 12 may further comprise a transferring circuit 811 configured to transfer a context of the positioning measurement to a radio network node 13 of a target cell 14 during a handover procedure.

The embodiments herein for handling positioning data in the radio communications network 1 may be implemented through one or more processors, such as a processing circuit 812 in the radio network node depicted in FIG. 8, together with computer program code for performing the functions and/or method steps of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12.

Those skilled in the art will also appreciate that the various "circuits" described may refer to a combination of analog and digital circuits, and/or one or more processor circuits 812 configured with software and/or firmware, e.g., stored in memory, that, when executed by the one or more processing circuits 812, perform as described above. One or more of these processor circuits 812, as well as the other digital hardware, may be included in a single application-specific integrated circuit (ASIC), or several processors and various digital hardware may be distributed among several separate components, whether individually packaged or assembled into a system-on-a-chip (SoC).

Figure 9:
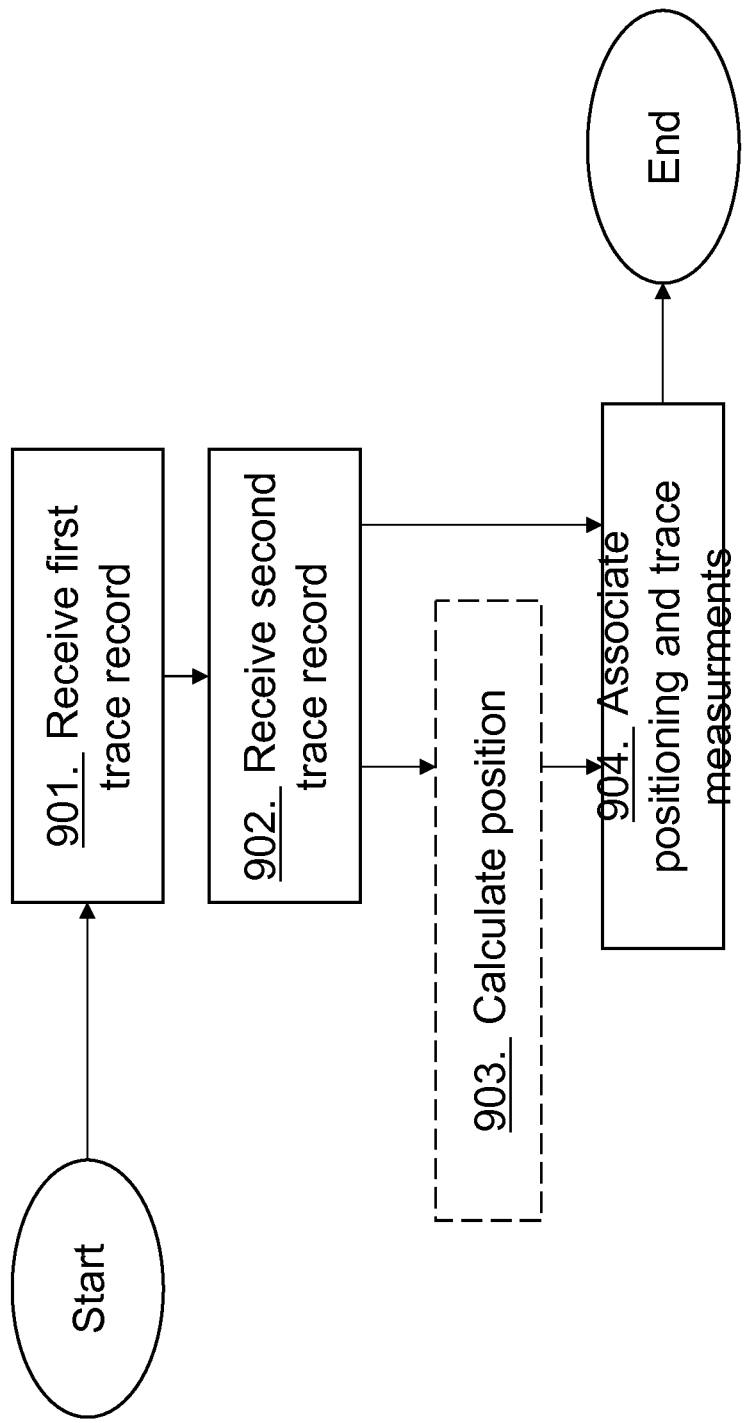
FIG. 9 is a schematic flowchart depicting embodiments of a method in a network management node.

The method actions in the network management node 19 for collecting a trace measurement in the radio communications network 1 according to some general embodiments will now be described with reference to a flowchart depicted in FIG. 9. The actions do not have to be taken in the order stated below, but may be taken in any suitable order. The network management node 19 collects the trace measurement from a UE in a cell served by a radio network node.

Action 901.

The network management node 19 receives a first trace record comprising a positioning measurement of the UE 10 from the radio network node 12.

Action 902.

The network management node 19 receives a second trace record comprising the trace measurement of the UE 10 of a tracing session from the radio network node 12.

Action 903.

The network management node 19 may further calculate a position of the UE 10 based on the received positioning measurement. Then, the network management node 19 may associate in action 903 below the calculated position to the received trace measurement in the second trace record.

Action 904.

The network management node 19 associates the received positioning measurement with the received trace measurement. In some embodiments the first trace record comprises a time stamp and a trace session identity and the second trace record comprises a trace session identity and a time stamp. The network management node 19 associates the received positioning measurement with the received trace measurement e.g. the first and second trace record, based on the respective trace session identity and the respective time stamp.

Figure 10:
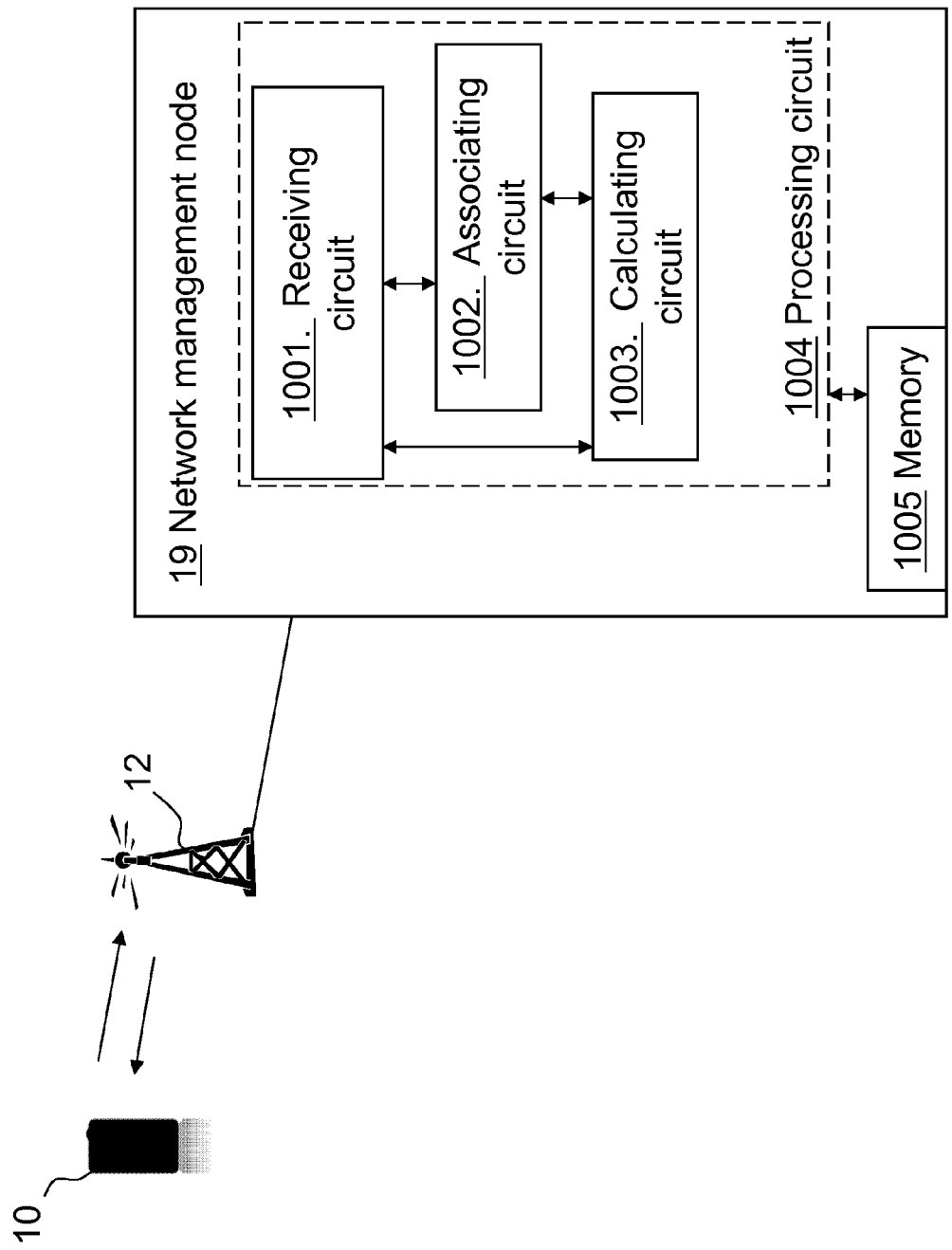
FIG. 10 is a block diagram depicting a network management node according to embodiments herein.

FIG. 10 is a block diagram depicting embodiments of the network management node 19 for collecting a trace measurement in the radio communications network 1. The network management node 19 is configured to collect the trace measurement from a UE in the cell 11 served by the radio network node 12.

The network management node 19 comprises a receiving circuit 1001 configured to receive a first trace record comprising a positioning measurement of the UE 10 from the radio network node 12. The receiving circuit 1001 is further configured to receive a second trace record comprising the trace measurement of the UE 10 of a tracing session from the radio network node 12.

The network management node 19 further comprises an associating circuit 1002 configured to associate the received positioning measurement with the received trace measurement. As stated above the first trace record may comprise a time stamp and a trace session identity and the second trace record may comprise a trace session identity and a time stamp. The associating circuit 1002 may then associate the received positioning measurement with the received trace measurement based on the respective trace session identity and the respective time stamp.

The network management node 19 may further comprise a calculating circuit 1003 configured to calculate the position of the UE 10 based on the positioning measurement. The associating circuit may then associate the calculated position with the received trace measurement in the second trace record.

The embodiments herein for collecting the trace measurement in the radio communications network 1 may be implemented through one or more processors, such as a processing circuit 1004 in the network management node 19 depicted in FIG. 10, together with computer program code for performing the functions and/or method steps of the embodiments herein. The program code mentioned above may also be provided as a computer program product, for instance in the form of a data carrier carrying computer program code for performing embodiments herein when being loaded into the network management node 19. One such carrier may be in the form of a CD ROM disc. It is however feasible with other data carriers such as a memory stick. The computer program code may furthermore be provided as pure program code on a server and downloaded to the network management node 19.

Those skilled in the art will also appreciate that the various "circuits" described may refer to a combination of analogue and digital circuits, and/or one or more processor circuits 1004 configured with software and/or firmware, e.g., stored in memory, that, when executed by the one or more processing circuits 1004, perform as described above. One or more of these processor circuits 1004, as well as the other digital hardware, may be included in a single application-specific integrated circuit (ASIC), or several processors and various digital hardware may be distributed among several separate components, whether individually packaged or assembled into a system-on-a-chip (SoC).

The network management node 19 may further comprise a memory 1005 to be used to store data on. The memory 1005 may comprise one or more memory units and may be used to store for example data such as positioning measurements, trace measurements, IMSI and/or IMEI, applications to perform the methods herein when being executed on the radio base station 12 or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a radio base station for handling positioning data in a radio communications network, which radio base station serves a user equipment in a cell of the radio communications network, the method comprising:
   receiving, at the radio base station from the user equipment, a first radio transmission of the radio communications network comprising a trace measurement of an on-going trace session,
      wherein the trace measurement is a measurement of a network performance of the user equipment initiated from the on-going trace session;
   receiving, at the radio base station from the user equipment, separately from the trace measurement, a second radio transmission of the radio communications network comprising a positioning measurement that is intercepted, by the radio base station, from an on-going positioning session between the user equipment and a positioning node;
   extracting, by the radio base station, positioning data from the positioning measurement received from the intercepted on-going positioning session between the user equipment and the positioning node, wherein the positioning data is generated responsive to the positioning measurement for determining a position of the user equipment;

combining, by the radio base station, at least a portion of the extracted positioning data with the trace measurement received from the on-going trace session into one trace record;

sending the one trace record from the radio base station to a network management node over the radio communications network, which trace record comprises the positioning data; and forwarding, by the radio base station, the intercepted positioning measurement to the positioning node over the radio communications network.

2. A method according to claim 1, further comprising:
receiving a trigger at the radio base station, from a network node, for activating a trace configuration for the trace session, and
initiating, by the radio base station responsive to receiving the trigger, the positioning session between the user equipment and the positioning node.

3. A method according to claim 2, wherein a duration of the positioning session is equal to a duration of the trace session.

4. A method according to claim 2, wherein the trace configuration specifics a Minimization of a Drive Test measurement as the trace measurement.

5. A method according to claim 2, wherein the trace configuration indicates a type of positioning measurement, accuracy of the positioning measurement, and/or periodicity of the positioning measurement to initiate.

6. A method of claim 2, wherein the initiating the positioning session is signaled via a Radio Resource Control, RRC, protocol.

7. A method according to claim 1, wherein the radio base station maintains a positioning protocol state of the on-going communication between the user equipment and the positioning node.

8. A method according to claim 1, further comprising:
retrieving by the radio base station a configuration signaling message from the positioning node, which configuration signaling message comprises configuration data for performing positioning measurements at the user equipment,
storing the configuration data at the radio base station; and
forwarding the retrieved configuration signaling message from the radio base station to the user equipment.

9. A method according to claim 1, wherein the obtaining, the sending of the positioning data, the forwarding, and/or the initiating is performed in a positioning protocol proxy functionality comprised in the radio base station.

10. A method according to claim 1, wherein the positioning measurement comprises a Long Term Evolution Positioning Protocol measurement.

11. A method according to claim 1, wherein the radio base station further transmits assistance data for determining position to the user equipment.

12. A method according to claim 1, further comprising transferring context of the positioning measurement to a radio base station of a target cell during a handover procedure.

13. A method according to claim 1, wherein the trace measurement of the on-going trace session from the user equipment received at the radio base station does not comprise the positioning data.

14. A method according to claim 1, further comprising:
aligning, by the radio base station, the extracted positioning data in time with the trace measurement prior to combining the extracted positioning data and the trace measurement into the one trace record.

15. A radio base station for handling positioning data in a radio communications network, which the radio base station serves a user equipment in a cell of the radio communications network, comprising:
a receiving circuit configured to receive, from the user equipment, a first radio transmission of the radio communications network comprising a trace measurement of an on-going trace session,
wherein the trace measurement is a measurement of a network performance of the user equipment initiated from the on-going trace session;
an obtaining circuit configured to receive at the radio base station from the user equipment, separately from the trace measurement, a second radio transmission of the radio communications network comprising a positioning measurement from the user equipment that is intercepted by the radio base station from an on-going positioning session between the user equipment and a positioning node and to extract positioning data from the positioning measurement received from the intercepted on-going positioning session between the user equipment and the positioning node,
wherein the positioning data is generated responsive to the positioning measurement for determining a position of the user equipment;
an associating circuit configured to combine at least a portion of the extracted positioning data with the trace measurement received from the on-going trace session into one trace record;
a sending circuit configured to send the one trace record from the radio base station to a network management node over the radio communications network, which trace record comprises the positioning data; and
a forwarding circuit configured to forward the intercepted positioning measurement to the positioning node over the radio communications network.

16. A radio base station according to claim 15, further comprising:
a receiving circuit configured to receive a trigger, from a network node, for activating a trace configuration for the trace session, and
an initiating circuit configured to initiate, responsive to receiving the trigger at the receiving circuit, the positioning session between the user equipment and the positioning node.

17. A radio base station according to claim 16, wherein a duration of the positioning session is equal to a duration of the trace session.

18. A radio base station according to claim 16, wherein the trace configuration specifies a Minimization of a Drive Test measurement as the trace measurement.

19. A radio base station according to claim 16, wherein the trace configuration indicates a type of positioning measurement, accuracy of the positioning measurement, and/or periodicity of the positioning measurement to initiate.

20. A radio base station according to claim 16, wherein the initiating circuit is configured to initiate the positioning session by signaling via a Radio Resource Control, RRC, protocol.

21. A radio base station according to claim 15, wherein the radio base station is configured to maintain a positioning protocol state of the on-going communication between the user equipment and the positioning node.

22. A radio base station according to claim 15,
wherein the obtaining circuit is further configured to retrieve a configuration signaling message from the positioning node, which configuration signaling message comprises configuration data for performing positioning measurements at the user equipment,
wherein the radio base station further comprises a storing circuit configured to store the configuration data at the radio base station; and
wherein the forwarding circuit is further configured to forward the retrieved configuration signaling message to the user equipment.

23. A radio base station according to claim 15, comprising a positioning protocol proxy functionality to obtain, to send the positioning data and/or to initiate the positioning session and/or to forward the positioning measurement or the configuration signaling message.

24. A radio base station according to claim 15, wherein the positioning measurement comprises a Long Term Evolution Positioning Protocol measurement.

25. A radio base station according to claim 15, further comprising
a transmitter configured to transmit assistance data for determining position to the user equipment.

26. A radio base station according to claim 15, further comprising
a transferring circuit configured to transfer a context of the positioning measurement to a radio base station of a target cell during a handover procedure.

27. A radio base station according to claim 15, wherein the trace measurement of the on-going trace session from the user equipment received at the radio base station does not comprise the positioning data.

28. A radio base station according to claim 15, wherein the associating circuit is further configured to align the extracted positioning data in time with the trace measurement prior to combining the extracted positioning data and the trace measurement into the one trace record.

* * * * *

UNITED STATES PATENT AND TRADEMARK OFFICE
CERTIFICATE OF CORRECTION

| | | |
|---|---|---|
| PATENT NO. | : 9,525,973 B2 | Page 1 of 2 |
| APPLICATION NO. | : 14/353609 | |
| DATED | : December 20, 2016 | |
| INVENTOR(S) | : Racz et al. | |

It is certified that error appears in the above-identified patent and that said Letters Patent is hereby corrected as shown below:

On the Title Page

Item [74], under "Attorney, Agent, or Firm", in Column 2, Line 1, delete "Myers Bigel, P.A." and insert -- Myers Bigel Sibley & Sajovec, P.A. --, therefor.

Item [56], under "OTHER PUBLICATIONS", in Column 1, Line 26, delete "11); )," and insert -- 11); --, therefor.

In the Specification

Column 3, Line 23, delete "(OAM)" and insert -- (O&M) --, therefor.

Column 3, Line 24, delete "OAM" and insert -- O&M --, therefor.

Column 13, Line 4, delete "L1 μL2," and insert -- L1, L2, --, therefor.

Column 13, Line 8, delete "L1 μL2," and insert -- L1, L2, --, therefor.

Column 20, Line 19, delete "(17)," and insert -- 17, --, therefor.

Column 21, Line 43, delete "UE" and insert -- UE 10 --, therefor.

In the Claims

Column 23, Line 27, Claim 4, delete "specifics" and insert -- specifies --, therefor.

Column 25, Line 8, Claim 22, delete "equipment," and insert -- equipment; --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

Column 26, Line 2, Claim 25, delete "comprising" and insert -- comprising: --, therefor.

Column 26, Line 6, Claim 26, delete "comprising" and insert -- comprising: --, therefor.